(12) United States Patent
Nekhamkin

(10) Patent No.: US 10,638,188 B2
(45) Date of Patent: Apr. 28, 2020

(54) METHOD OF ESTIMATING DIGITAL AUDIO AVAILABILITY FOR SUPPLEMENTAL AUDIO PROGRAMS IN HD RADIO BROADCAST

(71) Applicant: Ibiquity Digital Corporation, Columbia, MD (US)

(72) Inventor: Michael Nekhamkin, Bridgewater, NJ (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 16/100,806

(22) Filed: Aug. 10, 2018

(65) Prior Publication Data

US 2019/0327513 A1    Oct. 24, 2019

Related U.S. Application Data

(60) Provisional application No. 62/661,536, filed on Apr. 23, 2018.

(51) Int. Cl.
*H04N 21/43* (2011.01)
*H04N 21/235* (2011.01)
(Continued)

(52) U.S. Cl.
CPC ....... *H04N 21/4307* (2013.01); *H04N 21/233* (2013.01); *H04N 21/235* (2013.01);
(Continued)

(58) Field of Classification Search
CPC ............. H04N 21/4307; H04N 21/435; H04N 21/2368; H04N 21/233; H04N 21/4341; H04N 21/235; H04N 21/439; H04H 20/18
See application file for complete search history.

(56) References Cited

U.S. PATENT DOCUMENTS 8,144,612 B2    3/2012  Johnson et al.
8,451,868 B2    5/2013  Johnson et al.
(Continued)

FOREIGN PATENT DOCUMENTS

WO    WO-2019209691 A1    10/2019

OTHER PUBLICATIONS

"International Application Serial No. PCT/US2019/028470, International Search Report dated Jul. 16, 2019", 2 pgs.
(Continued)

*Primary Examiner* — Walter J Divito
(74) *Attorney, Agent, or Firm* — Schwegman Lundberg & Woessner, P.A.

(57) ABSTRACT

A radio signal processing circuit comprises multiple audio blend channels, an audio decoder, a program selector and a blending circuit. The audio blend channels are configured to receive digital audio packets for multiple supplemental audio programs. Each audio blend channel includes an audio blend buffer and a signal quality metric circuit. The signal quality metric (SQM) circuit configured to determines an audio quality indicator for the digital audio packets of the program and indicates availability of the program according to the audio quality indicator regardless of whether the program is selected for play. The program selector configured to provides digital audio packets from a selected audio blend channel to the audio decoder to produce a digital audio signal. The blending circuit blends the digital audio signal produced for the selected audio blend channel with a signal representing silence according to the audio quality indicator for the audio blend channel.

22 Claims, 12 Drawing Sheets

(51) Int. Cl.

| | |
|---|---|
| *H04N 21/435* | (2011.01) |
| *H04N 21/2368* | (2011.01) |
| *H04N 21/434* | (2011.01) |
| *H04N 21/439* | (2011.01) |
| *H04N 21/233* | (2011.01) |
| *H04H 20/18* | (2008.01) |

(52) U.S. Cl.
CPC ....... *H04N 21/2368* (2013.01); *H04N 21/435* (2013.01); *H04N 21/439* (2013.01); *H04N 21/4341* (2013.01); *H04H 20/18* (2013.01)

(56) References Cited

U.S. PATENT DOCUMENTS

| | | |
|---|---|---|
| 8,660,128 B2 | 2/2014 | Iannuzzelli et al. |
| 8,804,037 B2 | 8/2014 | Johnson et al. |
| 9,596,044 B2 | 3/2017 | Nekhamkin et al. |
| 9,768,853 B1 | 9/2017 | Kroeger et al. |
| 2005/0286664 A1 | 12/2005 | Chen et al. |
| 2006/0019601 A1 | 1/2006 | Kroeger et al. |
| 2010/0265398 A1 | 10/2010 | Johnson et al. |
| 2011/0090897 A1 | 4/2011 | Johnson et al. |
| 2012/0028567 A1 | 2/2012 | Marko |
| 2012/0162512 A1 | 6/2012 | Johnson et al. |
| 2012/0189069 A1 | 7/2012 | Iannuzzelli et al. |
| 2016/0241350 A1 | 8/2016 | Nekhamkin et al. |
| 2017/0024183 A1 | 1/2017 | Li et al. |

OTHER PUBLICATIONS

"International Application Serial No. PCT/US2019/028470, Written Opinion dated Jul. 16, 2019", 12 pgs.

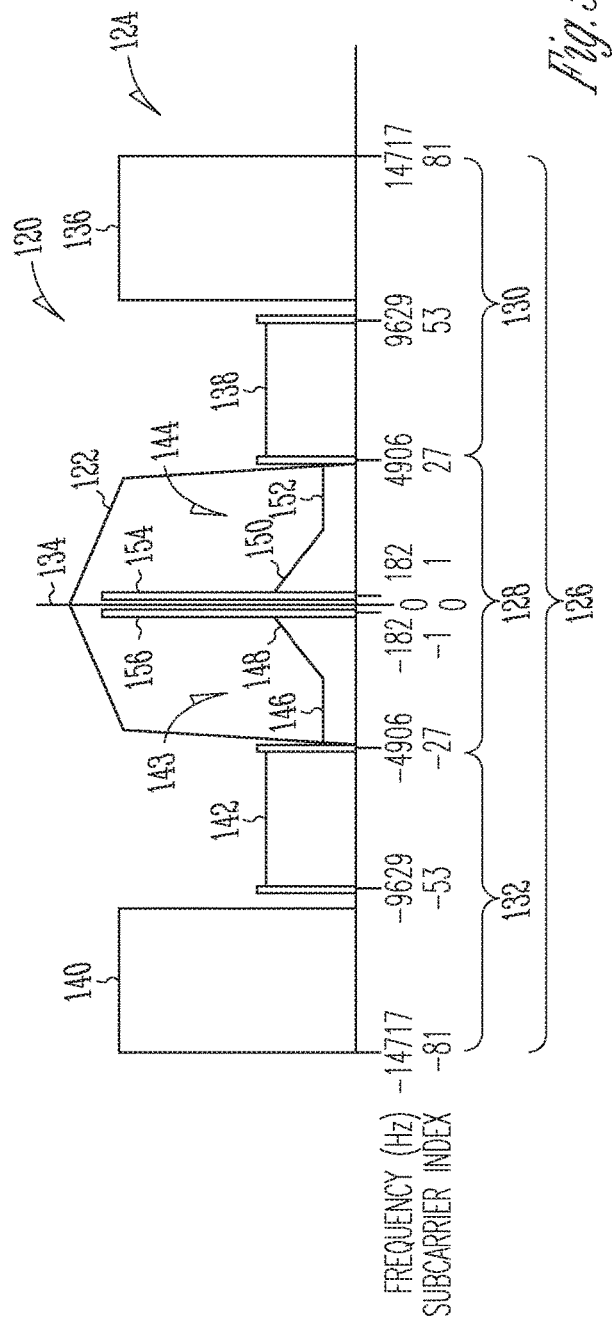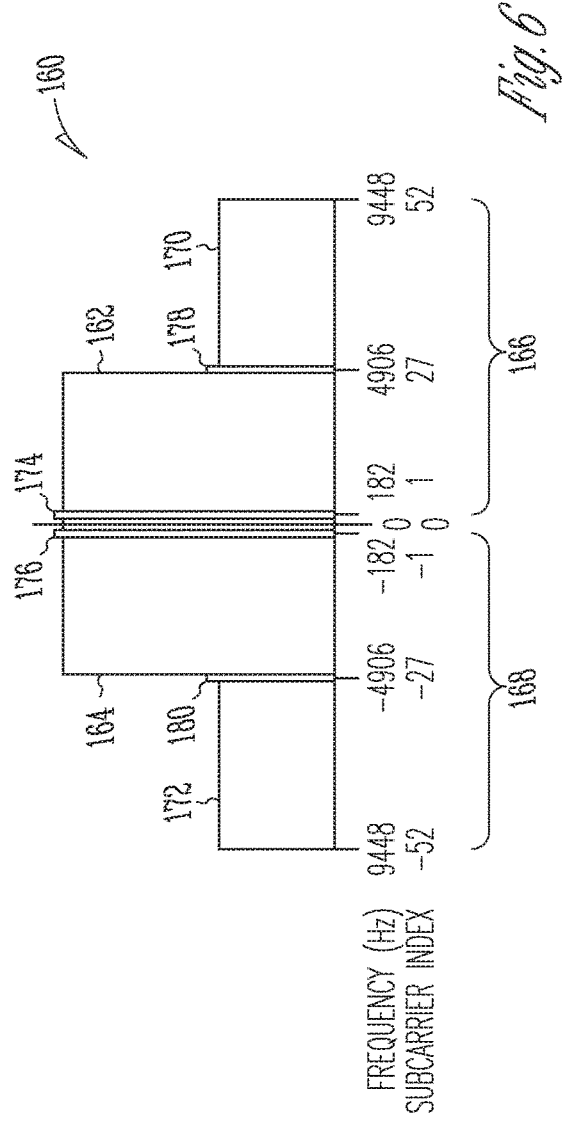

METHOD OF ESTIMATING DIGITAL AUDIO AVAILABILITY FOR SUPPLEMENTAL AUDIO PROGRAMS IN HD RADIO BROADCAST

CLAIM OF PRIORITY

This application claims priority to U.S. Provisional Application Ser. No. 62/661,536, filed on Apr. 23, 2018, and is hereby incorporated by reference herein in its entirety.

TECHNICAL FIELD

This invention relates to methods and apparatus for radio signal broadcasting, and more particularly, to methods and apparatuses for receiving and processing in-band on-channel (IBOC) radio signals.

BACKGROUND

Digital radio broadcasting technology delivers digital audio and data services to mobile, portable, and fixed receivers. One type of digital radio broadcasting, referred to as in-band on-channel digital audio broadcasting (IBOC DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception. IBOC DAB signals can be transmitted in a hybrid format including an analog modulated carrier in combination with a plurality of digitally modulated carriers or in an all-digital format wherein the analog modulated carrier is not used.

One feature of digital transmission systems is the ability to simultaneously transmit both digitized audio and data. Thus the technology also allows for wireless data services from amplitude modulation (AM) and frequency modulation (FM) radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

Using the hybrid format, broadcasters may continue to transmit analog AM and FM simultaneously with higher-quality and more robust digital signals, allowing themselves and their listeners to convert from analog-to-digital radio while maintaining their current frequency allocations. Using the all-digital format, additional data channels are available for broadcasters to transmit more data with the audio program.

An IBOC DAB radio system allows multiple services to share the broadcast capacity of a single station. One feature of digital transmission systems is the inherent ability to simultaneously transmit both digitized audio and data. Thus, one station can provide a Main Program Service (MPS), supplemental program service (SPS), and information services for, among other things, multicast programming, electronic program guides, navigation maps, traffic information, multimedia programming and other content. However, a challenge in providing digitized audio is reception for mobile radio receivers. Impairment of reception of the radio signal can negatively impact the experience of a user.

SUMMARY

The technology presented in this document relates to improvements in providing audio programming to digital radio receivers.

A radio signal processing circuit example includes multiple audio blend channels, an audio decoder, a program selector and a blending circuit. The audio blend channels are configured to receive digital audio packets for multiple supplemental audio programs. Each audio blend channel includes an audio blend buffer and a signal quality metric circuit. The signal quality metric (SQM) circuit configured to determine an audio quality indicator for the digital audio packets of the program and indicates availability of the program according to the audio quality indicator regardless of whether the program is selected for play. The program selector configured to provides digital audio packets from a selected audio blend channel to the audio decoder to produce a digital audio signal. The blending circuit blends the digital audio signal produced for the selected audio blend channel with a signal representing silence according to the audio quality indicator for the audio blend channel.

This section is intended to provide a brief overview of subject matter of the present patent application. It is not intended to provide an exclusive or exhaustive explanation of the invention. The detailed description is included to provide further information about the present patent application such as a discussion of the dependent claim and the interrelation of the dependent and independent claims in addition to the statements made in this section.

BRIEF DESCRIPTION OF THE DRAWINGS

FIG. 5 is a schematic representation of a hybrid AM IBOC DAB waveform.

FIG. 6 is a schematic representation of an all-digital AM IBOC DAB waveform.

DESCRIPTION

The following description describes various embodiments of methods and apparatuses that provide improved service of audio programs using IBOC DAB radio signals. Digital radio receivers can receive supplemental audio programs broadcast with main audio program in an IBOC DAB radio signal. Impairment of reception of the radio signal may cause the audio associated with the supplemental program to be unavailable even though the receiver may display that the supplemental program is available. Selection of the displayed program may result in no audio being played, which may lead the user to believe the receiver is malfunctioning.

IBOC System and Waveforms

Figure 1:
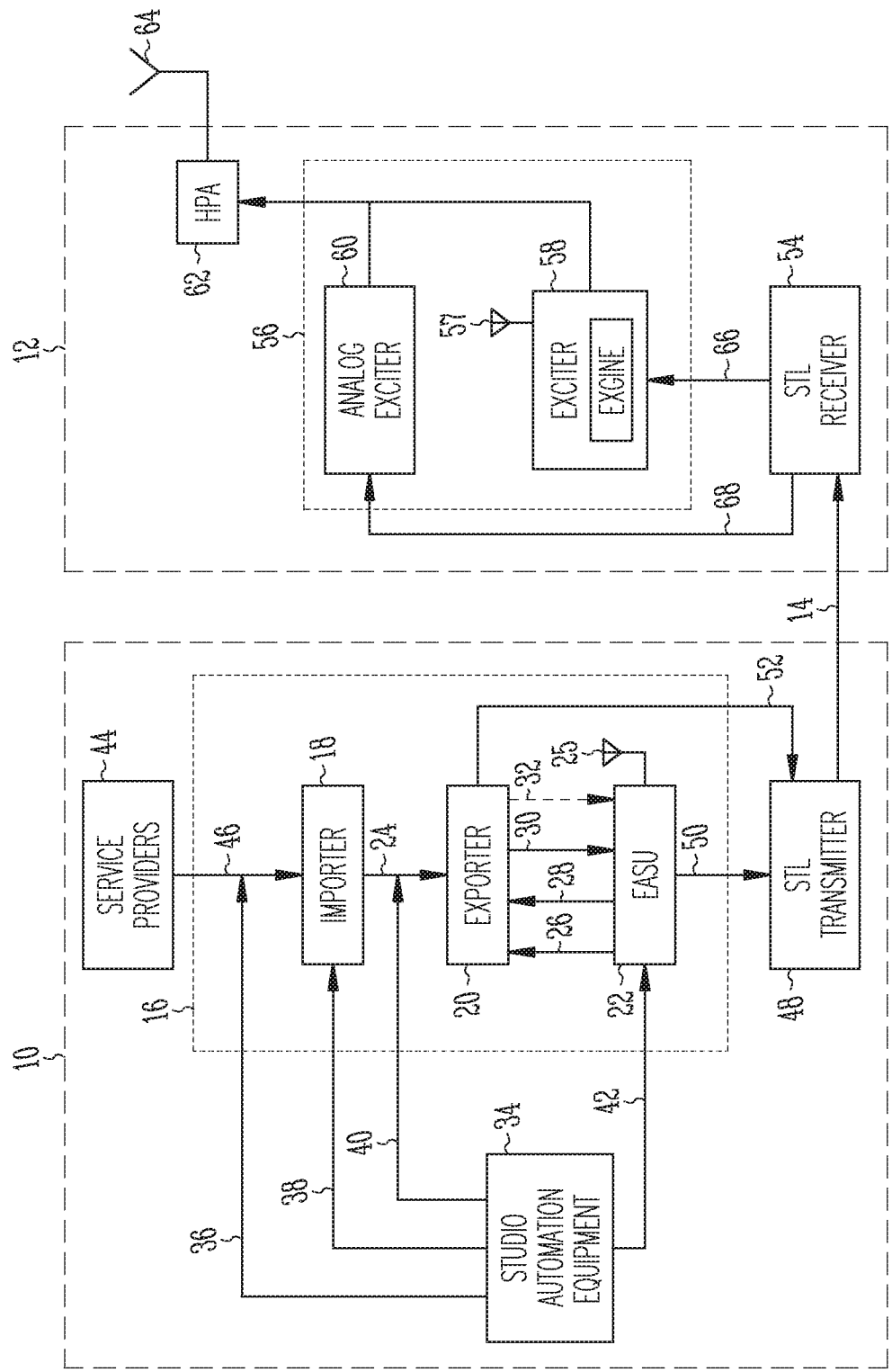
FIG. 1 is a block diagram of a transmitter for use in radio broadcasting of an in-band on-channel (IBOC) digital audio broadcasting (DAB) radio signal.

Referring to the drawings, FIG. 1 is a functional block diagram of the relevant components of a studio site 10, an FM transmitter site 12, and a studio transmitter link (STL) 14 that can be used to broadcast an FM IBOC DAB signal. The studio site includes, among other things, studio automation equipment 34, an Ensemble Operations Center (EOC) 16 that includes an importer 18, an exporter 20, an exciter auxiliary service unit (EASU) 22, and an STL transmitter 48. The transmitter site includes an STL receiver 54, a digital exciter 56 that includes an exciter engine (engine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. Supplemental program service can include supplementary audio content as well as program associated data.

The importer contains hardware and software for supplying advanced application services (AAS). A "service" is content that is delivered to users via an IBOC DAB broadcast, and AAS can include any type of data that is not classified as MPS, SPS, or Station Information Service (SIS). SIS provides station information, such as call sign, absolute time, position correlated to GPS, etc. Examples of AAS data include real-time traffic and weather information, navigation map updates or other images, electronic program guides, multimedia programming, other audio services, and other content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host controller (e.g., a processor), digital up-converter, RF up-converter, and engine subsystem 58. The engine accepts exciter link data and modulates the digital portion of the IBOC DAB waveform. The digital up-converter of exciter 56 converts from digital-to-analog the baseband portion of the engine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1), the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the engine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Figure 2:
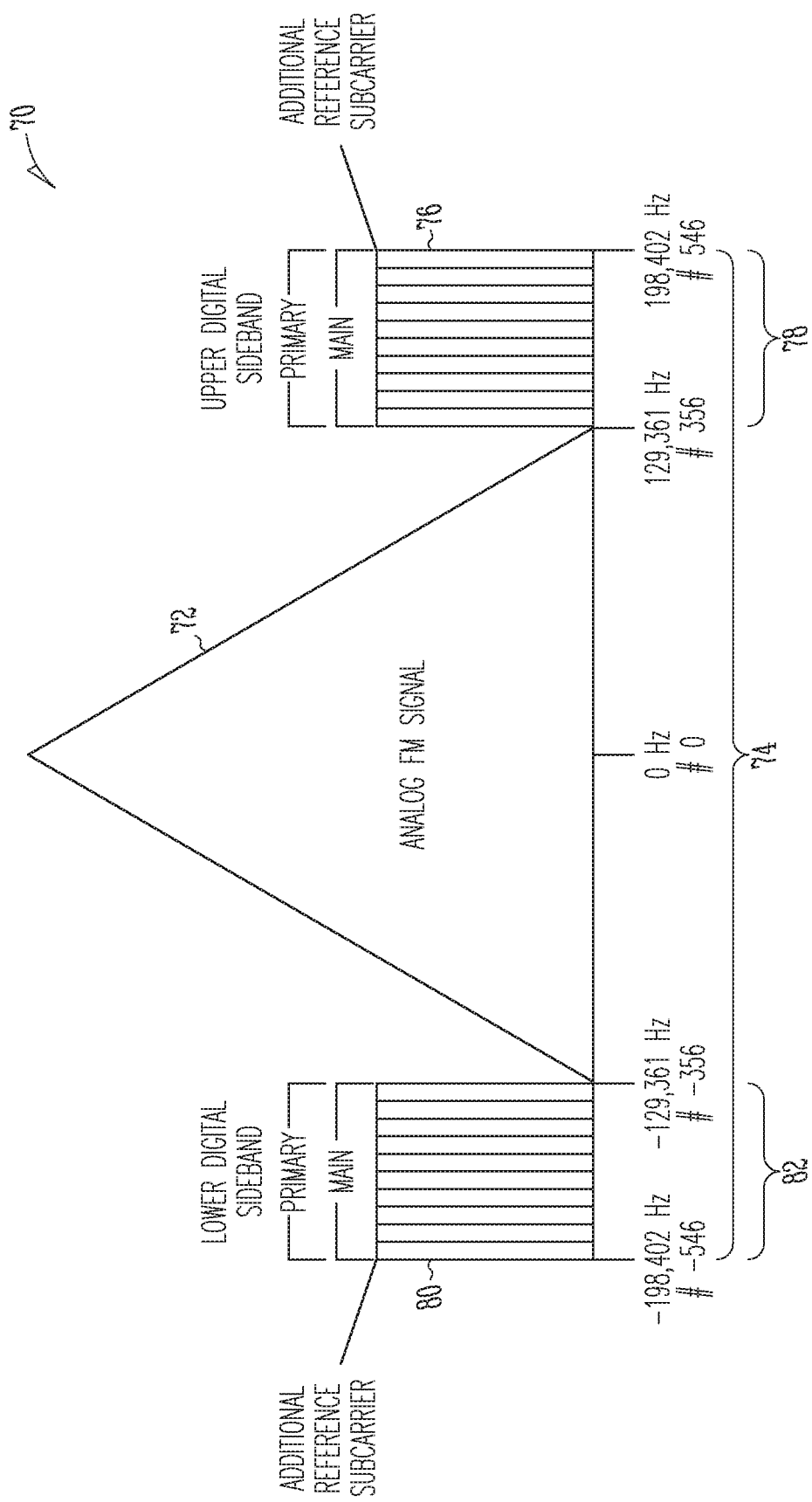
FIG. 2 is a schematic representation of a hybrid FM IBOC DAB waveform.

FIG. 2 is a schematic representation of a hybrid FM IBOC DAB waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
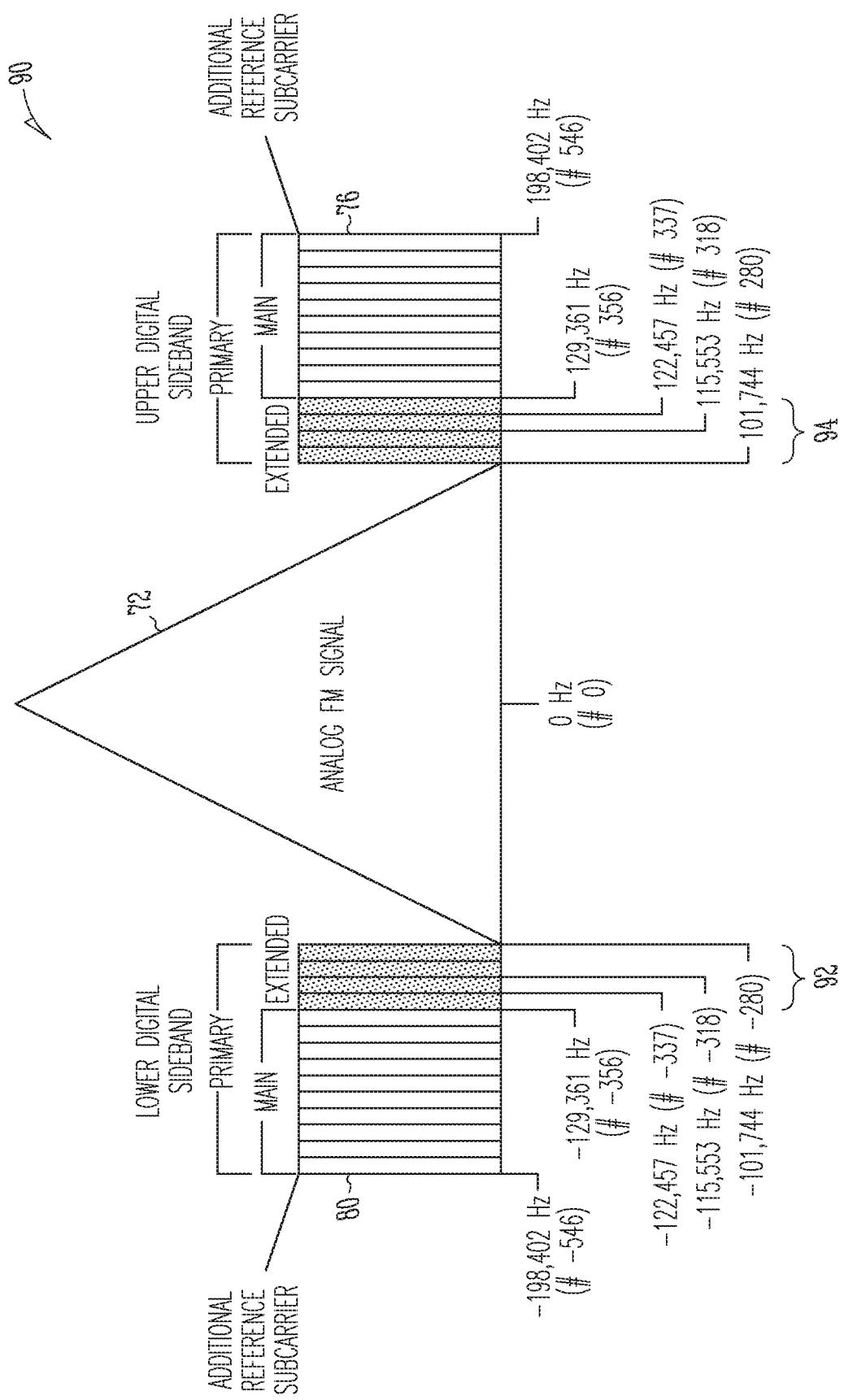
FIG. 3 is a schematic representation of an extended hybrid FM IBOC DAB waveform.

FIG. 3 is a schematic representation of an extended hybrid FM IBOC DAB waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
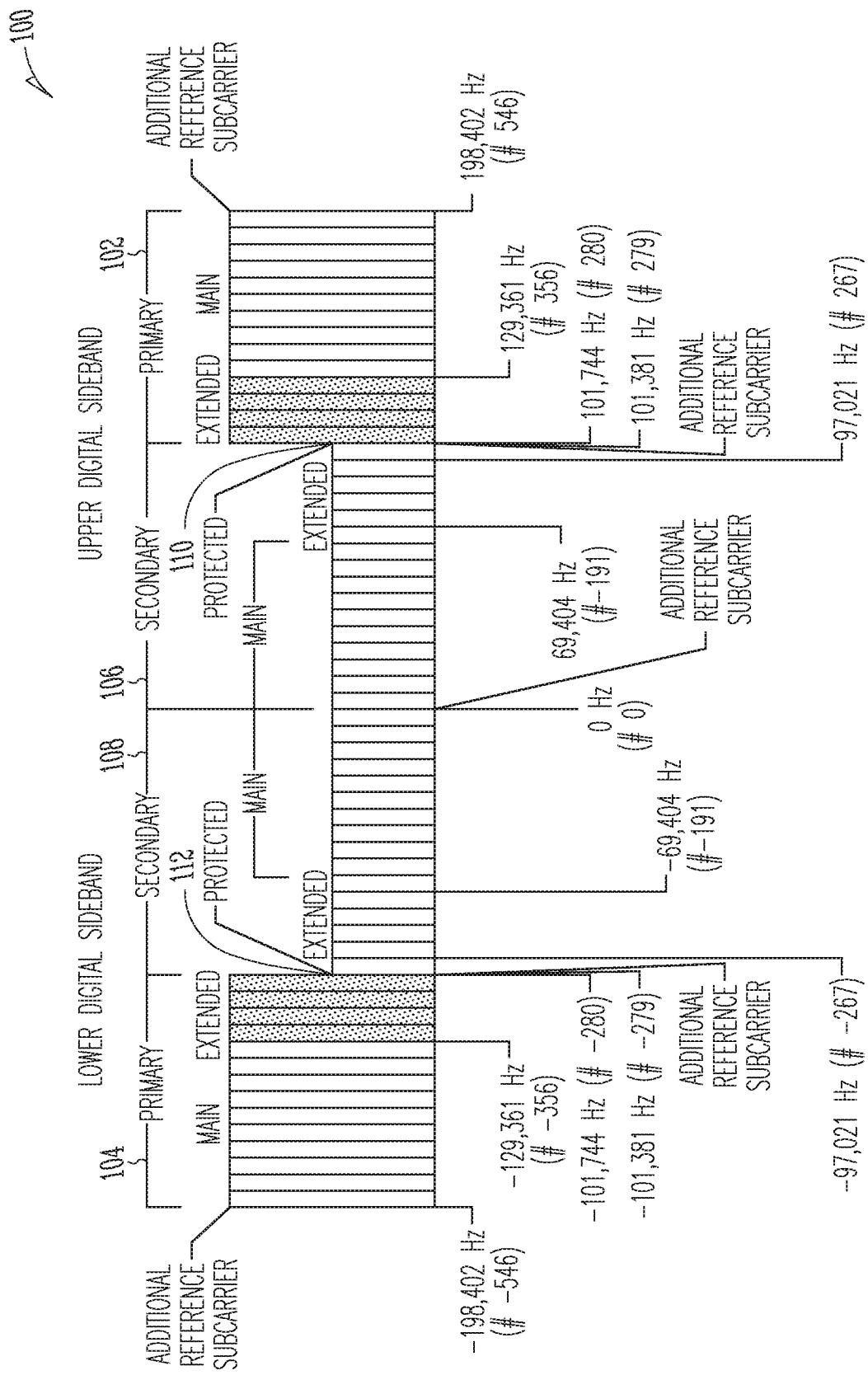
FIG. 4 is a schematic representation of an all-digital FM IBOC DAB waveform.

FIG. 4 is a schematic representation of an all-digital FM IBOC DAB waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

FIG. 5 is a schematic representation of an AM hybrid IBOC DAB waveform 120. The hybrid format includes the conventional AM analog signal 122 (bandlimited to about ±5 kHz) along with a nearly 30 kHz wide DAB signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC DAB signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146, 148, 150 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. In this example, the power level of the inner subcarriers in groups 148 and 150 is shown to decrease linearly with frequency spacing from the center frequency. The remaining groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

FIG. 6 is a schematic representation of the subcarrier assignments for an all-digital AM IBOC DAB waveform. The all-digital AM IBOC DAB signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
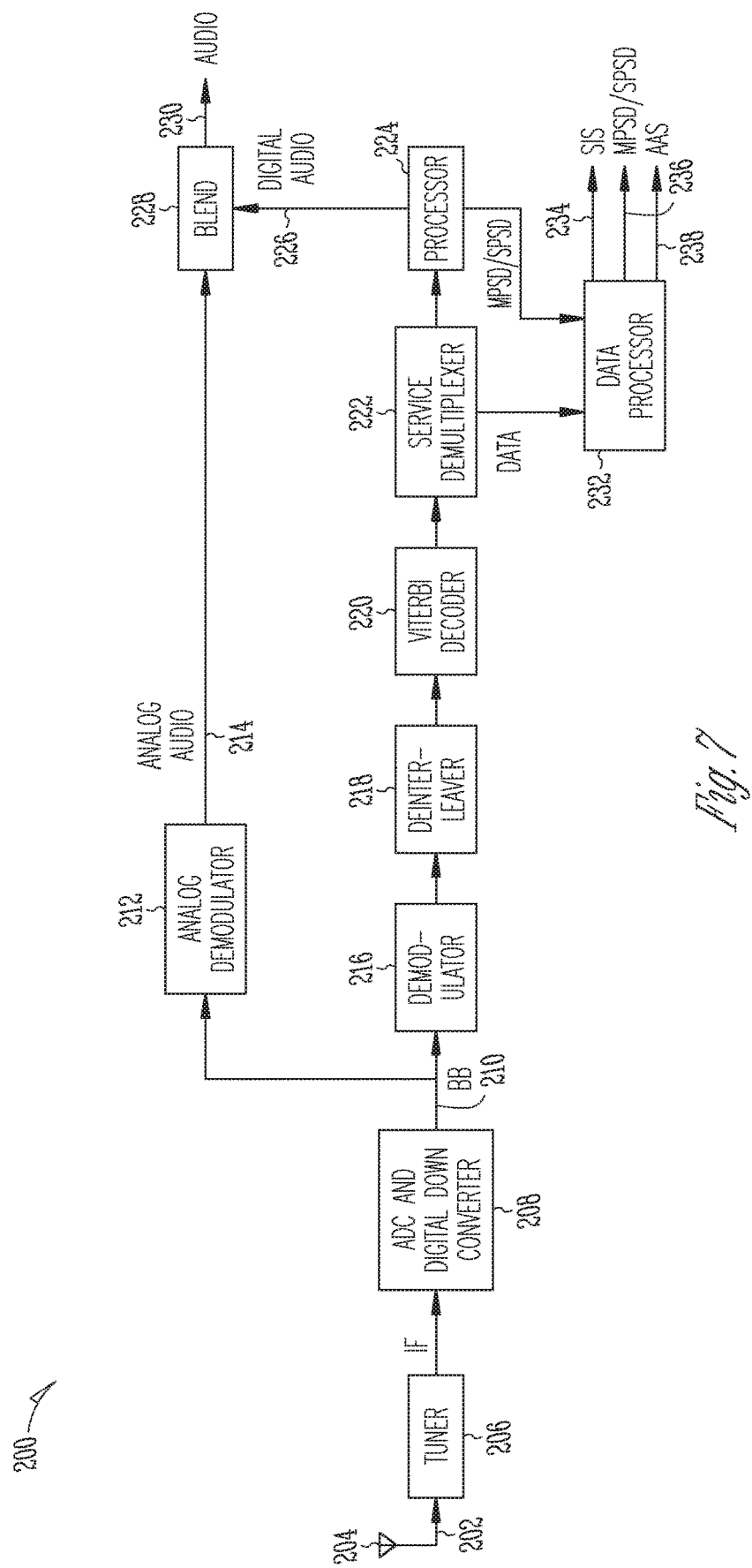
FIG. 7 is a functional block diagram of an AM IBOC DAB receiver.

FIG. 7 is a simplified functional block diagram of an AM IBOC DAB receiver 200. The receiver includes an input 202 connected to an antenna 204, tuner circuitry or front end circuitry 206, and a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data signals can include, for example, a station information service (SIS), main program service data (MPSD), supplemental program service data (SPSD), and one or more auxiliary application services (AAS).

Figure 8:
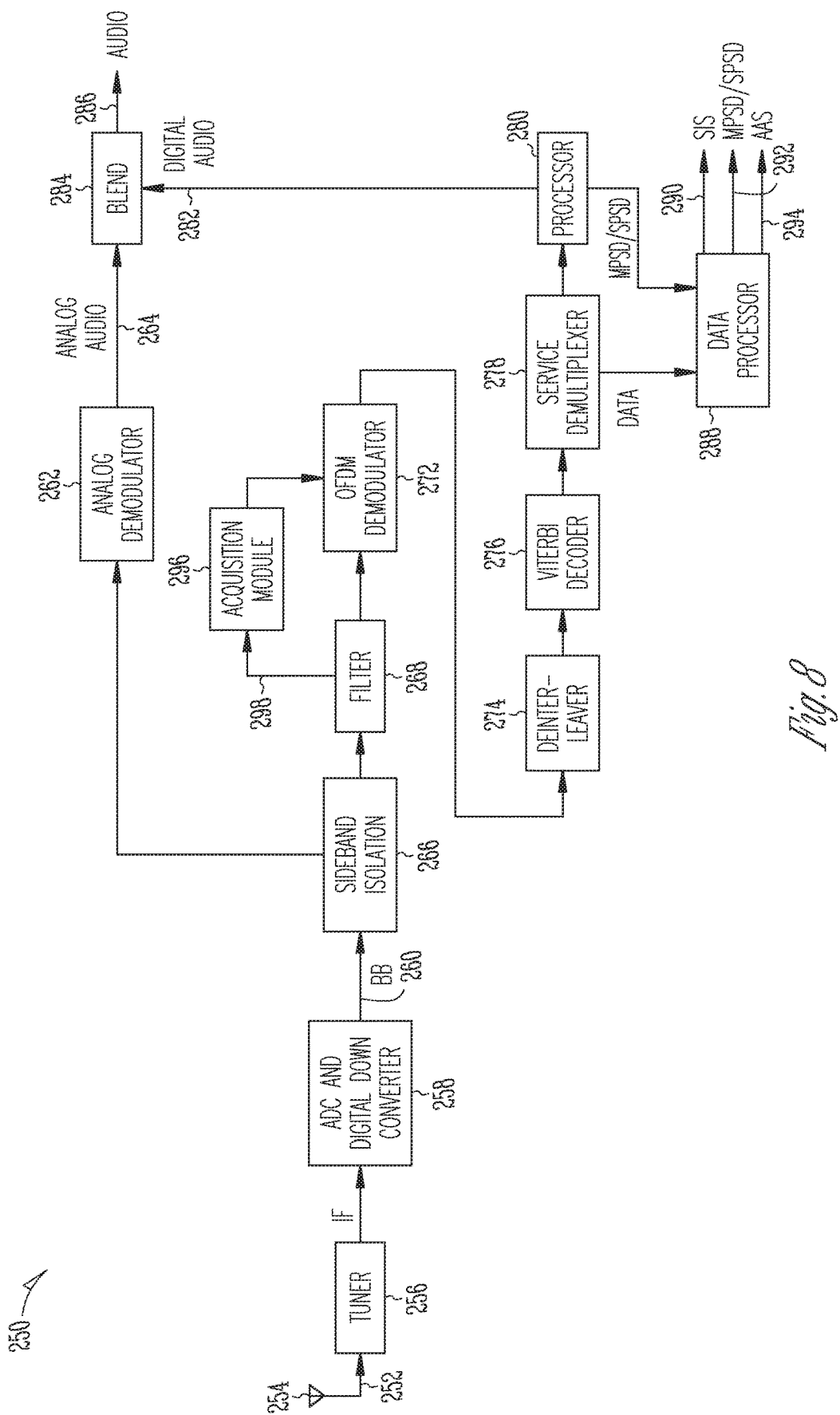
FIG. 8 is a functional block diagram of an FM IBOC DAB receiver.

FIG. 8 is a simplified functional block diagram of an FM IBOC DAB receiver 250. The receiver includes an input 252 connected to an antenna 254 and tuner circuitry or front end circuitry 256. A received signal is provided to an analog-to-digital converter and digital down converter 258 to produce a baseband signal at output 260 comprising a series of complex signal samples. The signal samples are complex in that each sample comprises a "real" component and an "imaginary" component, which is sampled in quadrature to the real component. An analog demodulator 262 demodulates the analog modulated portion of the baseband signal to produce an analog audio signal on line 264. The digitally modulated portion of the sampled baseband signal is next filtered by sideband isolation filter 266, which has a pass-band frequency response comprising the collective set of subcarriers $f_1$-$f_n$ present in the received OFDM signal. Filter 268 suppresses the effects of a first-adjacent interferer. Complex signal 298 is routed to the input of acquisition module 296, which acquires or recovers OFDM symbol timing offset or error and carrier frequency offset or error from the received OFDM symbols as represented in received complex signal 298. Acquisition module 296 develops a symbol timing offset $\Delta t$ and carrier frequency offset $\Delta f$, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282. The analog and main digital audio signals are blended as shown in block 284, or the supplemental program signal is passed through, to produce an audio output on line 286. A data processor 288 processes the data signals and produces data output signals on lines 290, 292 and 294. The data signals can include, for example, a station information service (SIS), main program service data (MPSD), supplemental program service data (SPSD), and one or more advanced application services (AAS).

In practice, many of the signal processing functions shown in the receivers of FIGS. 7 and 8 can be implemented using one or more integrated circuits.

Figure 9A:
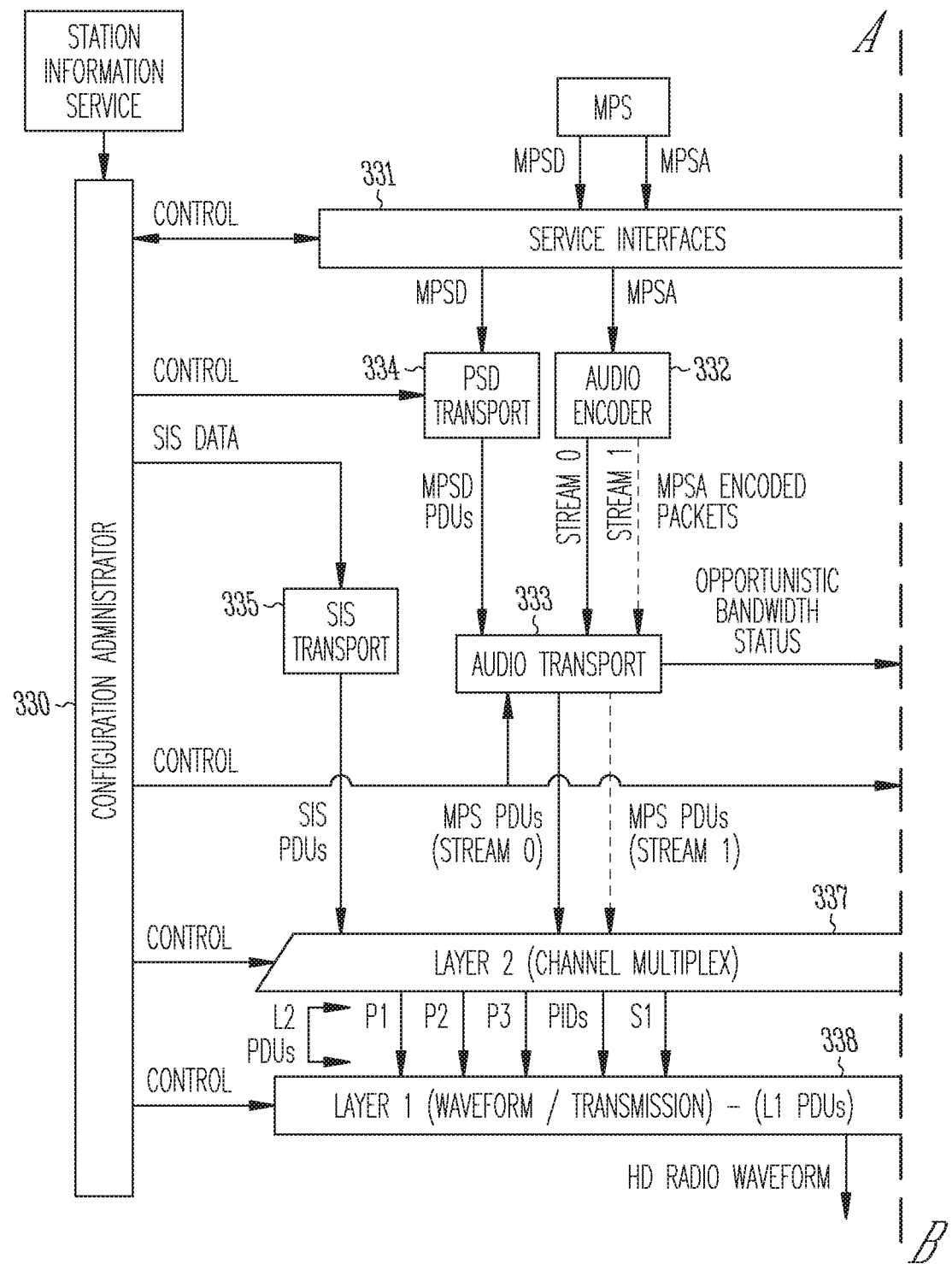
FIGS. 9a and 9b are diagrams of an IBOC DAB logical protocol stack from the broadcast perspective.
Figure 9B:
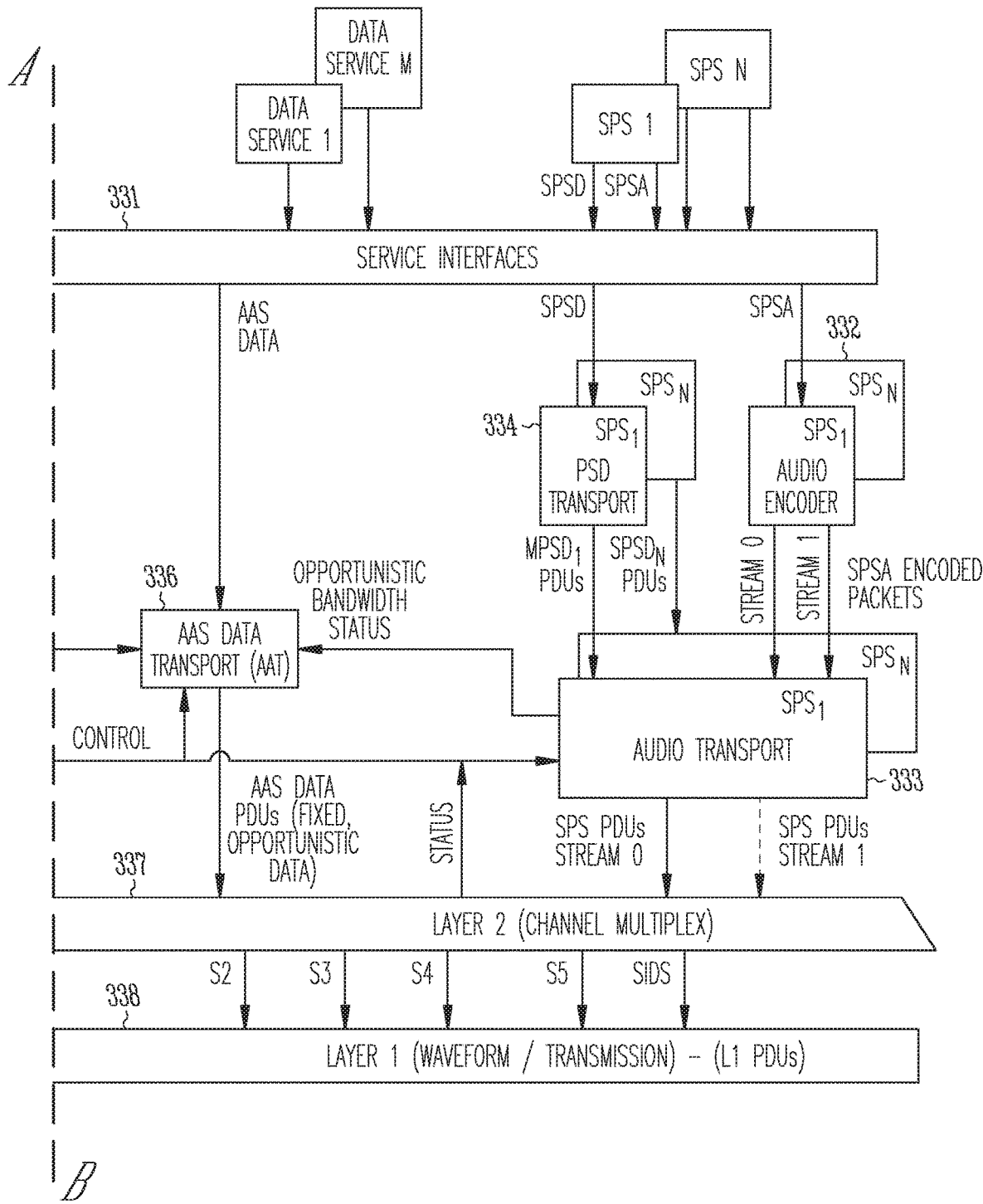

FIGS. 9a and 9b are diagrams of an IBOC DAB logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9a and 9b, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services except SIS. The service interface may be different for each of the various types of services. For example, for MPS audio and SPS audio, the service interface may be an audio card. For MPS data and SPS data the interfaces may be in the form of different application program interfaces (APIs). For all other data services the interface is in the form of a single API. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by program service data (PSD) transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, program type, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving. OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
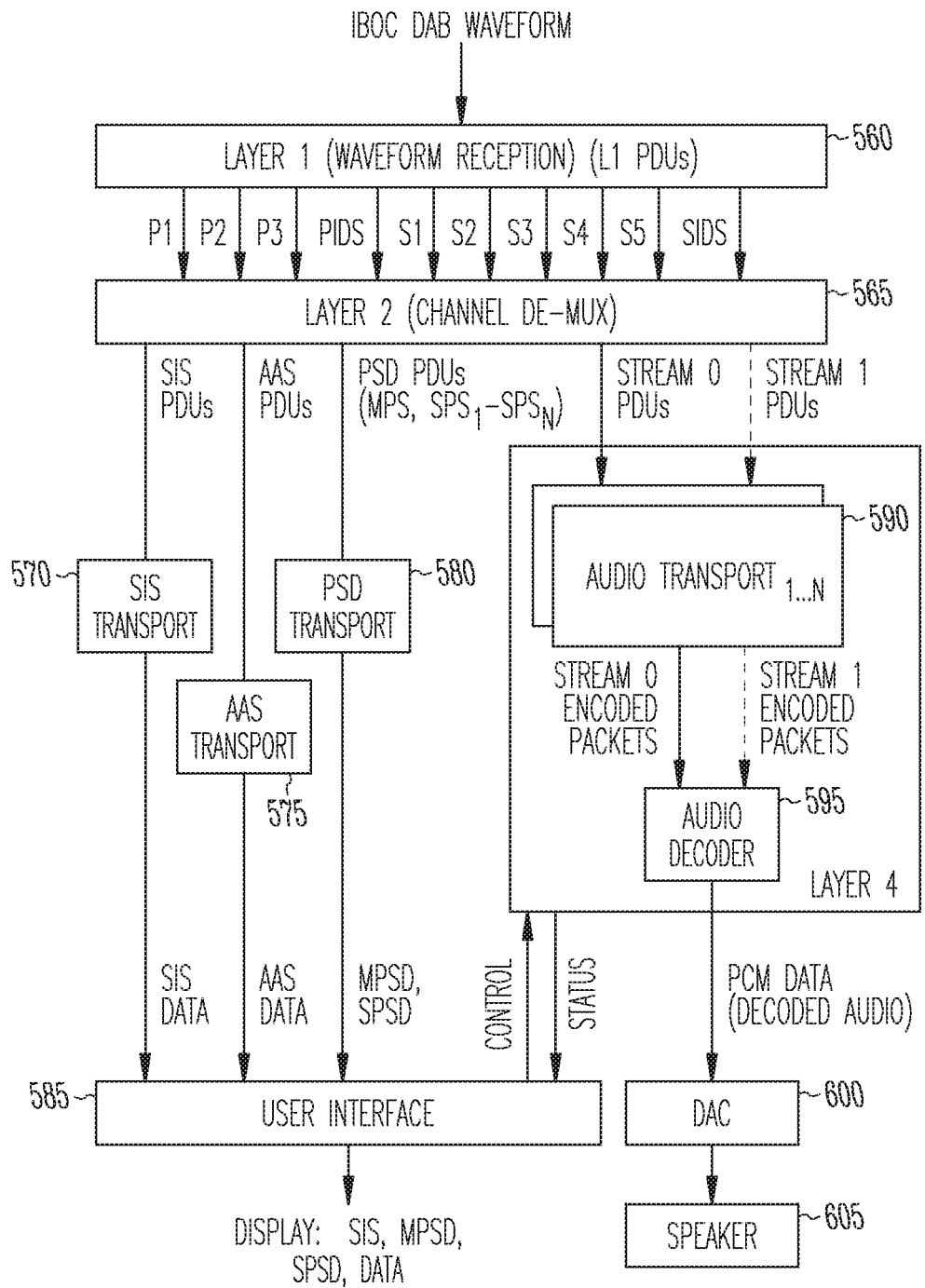
FIG. 10 is a diagram of an IBOC DAB logical protocol stack from the receiver perspective.

FIG. 10 shows the logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P3, PIDS, S1-S5, and SIDS. Layer 1 produces L1 PDUs corresponding to the logical channels and sends the PDUs to Layer 2 (565), which demultiplexes the L1 PDUs to produce SIS PDUs, AAS PDUs, PSD PDUs for the main program service and any supplemental program services, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). The SIS data, AAS data. MPSD and SPSD are then sent to a user interface 585. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and to seek or scan for radio stations broadcasting an all-digital or hybrid IBOC signal. Layer 4 also provides status information to the user interface.

With hybrid format IBOC DAB radio broadcasting, the audio signal can be redundantly transmitted on the analog modulated carrier and the digitally modulated subcarriers by transmitting the analog audio AM or FM backup audio signal (which is delayed by the diversity delay) so that the analog AM or FM backup audio signal can be fed to the audio output when the digital audio signal is absent, unavailable, or degraded. In these situations, the analog audio signal is gradually blended into the output audio signal by attenuating the digital signal such that the audio is fully blended to analog as the digital signal becomes unavailable. Similar blending of the digital signal into the output audio signal occurs as the digital signal becomes available by attenuating the analog signal such that the audio is fully blended to digital as the digital signal become available.

With all-digital format IBOC DAB radio broadcasting, the digital audio signal is blended with a signal representing silence, or a muted audio signal, as the digital audio signal becomes unavailable and available for the mobile receiver. For either the hybrid format or the all-digital format, multiple audio programs can be provided to the receiver of the user. These can include a main audio program and multiple supplemental audio programs.

The IBOC DAB radio receiver can be operatively coupled to a host controller. The receiver can provide information to the host controller regarding the availability of the supplemental audio programs. Based on the availability information, the host controller presents the supplemental audio programs to the user for selection. The user can select a supplemental audio program and listen to the audio. However, there may be areas where the reception of radio signals that include the supplemental audio programs is impaired such that the audio for a supplemental audio program is not available even though the host controller indicates the supplemental audio program is available.

A solution is to indicate the availability of a supplemental audio program to the host controller based on audio data for the program being present. This can be done by producing audio quality indicators for the program during the process of decoding the audio data. An audio quality indicator can reflect the availability of an audio program for play. However, to determine the audio quality indicator or indicators, the supplemental audio program needs to be selected for play so the audio is decoded and the audio quality determined. This means that until the user selects the program for play the status of the audio for the program is unknown. This can create a bad experience for the user of the radio receiver. The user expects the audio to be available if the program is indicated to be available, but this may be the case with an impaired radio signal.

A better approach is to accurately predict the status of the audio acquisition of a program beforehand, even though that program is not yet selected by a user of the receiver. This prediction can be implemented for the main audio program and for multiple supplemental audio programs. When a user selects one of the programs, the audio will be available. If the audio is not available, the program is not presented to the user for selection, or the receiver indicates to the user (e.g., using a display) that the audio is not available for the program. The user does not expect the audio to be available and the user does not think the receiver is malfunctioning.

Figure 11:
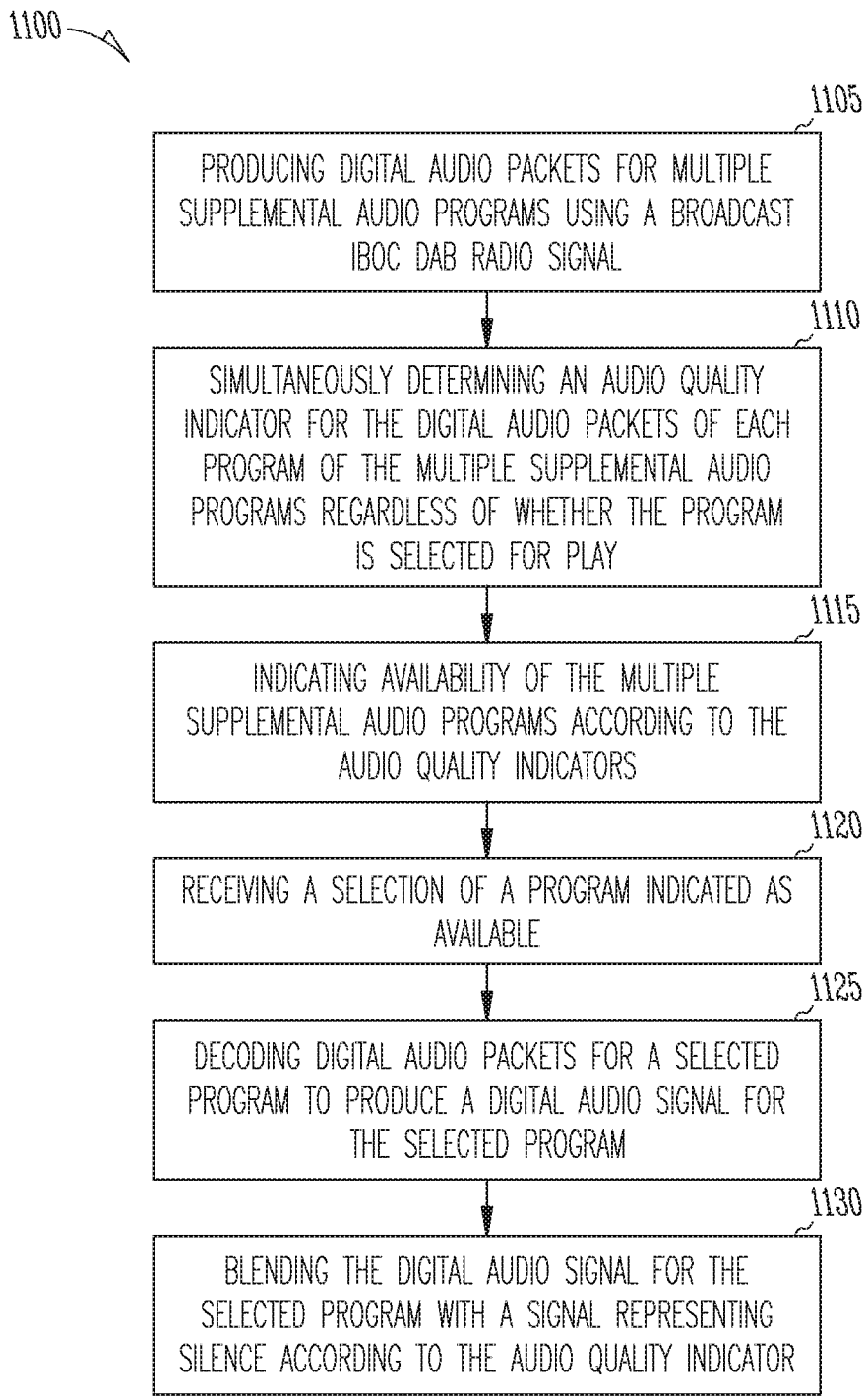
FIG. 11 is a flow diagram of a method of controlling operation of an IBOC DAB radio signal receiver.

FIG. 11 is a flow diagram of a method 1100 of controlling operation of an IBOC DAB radio signal receiver. At 1105, digital audio packets are produced for multiple supplemental audio programs using a broadcast IBOC DAB radio signal. At 1110, the radio receiver simultaneously determines at least one audio quality indicator for the digital audio packets. The receiver determines the audio quality indicator of each program of the multiple supplemental audio programs regardless of whether the program is selected for play. The receiver may also simultaneously determine at least one audio quality indicator for the main audio program. The audio quality indicator may be an audio signal quality metric (SQM).

At 1115, the receiver indicates the availability of the multiple supplemental audio programs according to the audio quality indicators. In certain examples, the radio receiver presents the program for selection using a display (e.g., by a display icon) when the audio quality indicator indicates that the audio for the program is available. In certain embodiments, the radio receiver indicates an audio program on the display, but changes the display (e.g., by ghosting the icon used for the selection) and disables selection of the program when the audio for the program is not available.

At 1120, a selection is received of a program that was indicated to be available. The selection may be received using a user interface of the radio receiver. The user interface may include a touch screen display or one or more buttons to receive a selection from a user. At 1125, the digital audio packets for the selected program are decoded to produce a digital audio signal for the selected program. Note that the audio quality indicators are determined prior to the audio decoding. Selection of an audio program is not necessary for the audio indicators to be calculated and the availability of the audio program to be indicated by the receiver. Calculation of the digital audio acquired status flags for the programs is performed in the background and the calculation doesn't interfere with the audio decoding process.

At 1130, if the selected program is a supplemental audio program, the digital audio signal produced for the selected program is blended with a signal representing silence (e.g., a muted audio signal) according to the audio quality indicator. If the selected signal is the main audio program, the digital audio signal for the main program is blended with either a signal representing silence or an analog audio signal sampled by the radio receiver.

Figure 12:
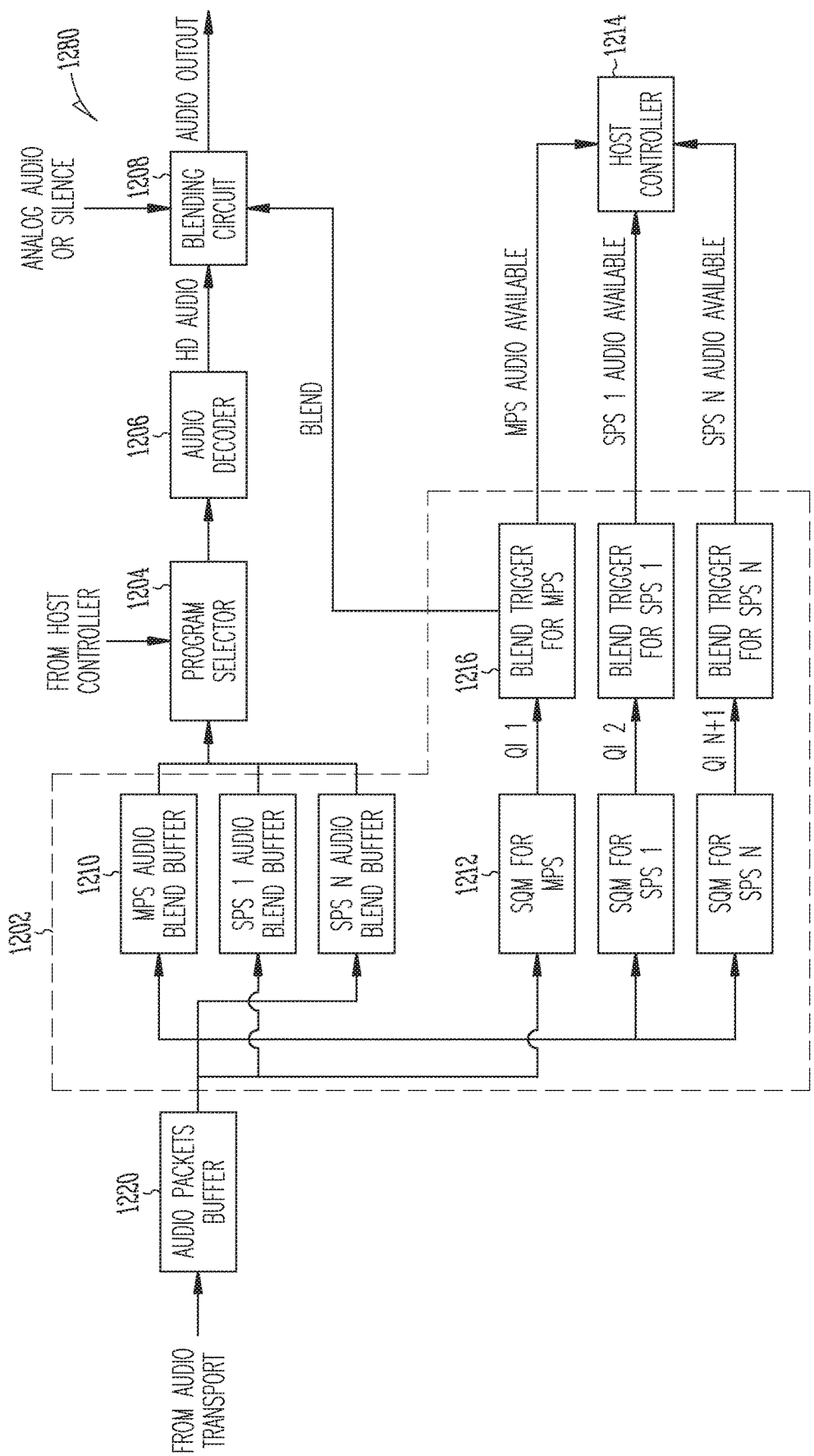
FIG. 12 is a block diagram of a radio program blend architecture of a radio signal processing circuit.

FIG. 12 is a block diagram of a radio program blend architecture of a radio signal processing circuit 1280. The circuit receives digital audio packets for multiple supplemental audio programs. The circuit may receive the digital audio packets from audio transport circuitry (e.g., audio transport 590 of FIG. 10), which are produced from an IBOC DAB radio signal. The digital audio packets may be received into an audio packets buffer 1220.

The radio signal processing circuit 1280 includes multiple audio blend channels 1202, a program selector 1204, an audio decoder 1206, and a blending circuit 1208. In some embodiments, there is an audio blend channel 1202 for each supplemental audio program. FIG. 12 shows an audio blend channel for each of N supplemental programs, where N is a positive integer greater than one. Each audio blend channel includes an audio blend buffer 1210 and a signal quality metric (SQM) circuit 1212. Each audio blend buffer 1210 stores the digital audio packets for a separate program of the multiple supplemental audio programs. Each SQM circuit 1212 determines an audio quality indicator (QI) for the digital audio packets of the supplemental audio program stored in the corresponding audio blend buffer. The audio QI indicates the availability of audio data for the program. The SQM circuits 1212 calculate the audio QI and indicate availability of audio for the program in the audio channel buffer regardless of whether the program is selected for play by program selector 1204.

The program selector 1204 transfers digital audio packets from a selected audio blend channel to the audio decoder. The selection of a program is received by the program selector 1204 from a host controller 1214, and the digital audio packets for the audio blend buffer for the program are transferred to the audio decoder 1206. In certain embodiments, the host controller 1214 multiplexes the digital audio packets from the audio blend buffers 1210 to the audio decoder 1206. The audio decoder 1206 produces a digital audio signal for play using the digital audio packets from the selected supplemental audio program.

The blending circuit 1208 blends the digital audio signal produced for the selected audio blend channel with a signal representing silence according to the audio QI for the audio blend channel. If the radio signal for the selected audio program becomes impaired and the audio QI indicates that audio is not available, the blending circuit 1208 will gradually transition the audio output signal for the program to silence. When the audio QI indicates the radio signal is no longer impaired, the blending circuit 1208 gradually transitions the audio output signal from silence back to the produced digital audio signal for the program.

In some embodiments, each audio blend channel 1202 includes a corresponding blend trigger circuit 1216. Each blend trigger circuit 1216 receives an audio QI from a corresponding SQM circuit 1212. Each blend trigger circuit 1216 indicates when to use the digital audio packets of the corresponding audio blend buffer 1210 or the signal representing silence to produce the audio output signal for the receiver. In certain embodiments, the indication from a blend trigger circuit 1216 can be a blend signal provided to the blending circuit 1208. The blend signal may be active when the blending circuit 1208 is to use the digital audio signal and its audio blend channel is selected.

In some embodiments, the radio signal processing circuit 1280 includes an audio blend channel for the main audio program and multiple audio blend channels for the multiple supplemental audio programs. FIG. 12 shows N+1 audio blend channels. One audio blend channel for the main audio program and N audio blend channels for the N supplemental audio programs. A separate audio program is received into each audio blend channel. In certain variations there are eight audio blend channels, or N+1=8. If there are more audio programs than audio blend channels, the audio blend channels may be allocated by the host controller to supplemental audio programs (e.g., in response to input received via the user interface 585 of FIG. 10). In some embodiments, the received digital audio packets are compressed digital audio packets. This can reduce the amount of memory needed to buffer the main audio program and the multiple supplemental audio programs.

As explained previously herein, each of the audio blend channels includes a blend trigger circuit; including a blend trigger circuit for the main audio program blend channel allocated to the main audio program. FIG. 12 shows N+1 blend trigger circuits; one for the main audio program and one for each supplemental audio program. In the example of FIG. 12, in addition to the blend signal, each blend trigger circuit 1216 of the audio blend channels can provide an audio available signal to the host controller 1214. FIG. 12 shows N+1 audio available signals provided to the host controller 1214. In certain embodiments, the audio available signal of a selected audio blend channel is provided to the blending circuit 1208 as the blend signal. In certain embodiments, the audio available signal is provided by the SQM circuit 1212 of an audio blend channel. The audio available signals are provided to the host controller whether or not the corresponding main or supplemental audio program is selected for play.

In some embodiments, the IBOC DAB radio signal is an all-digital IBOC DAB radio signal and digital audio packets are received by the main audio program blend channel. The blend trigger circuit of the main audio blend channel indicates to the blending circuit 1208 to use the digital audio signal of the main audio program or the signal representing silence to produce the audio output signal. In some embodiments, the IBOC DAB radio signal is a hybrid IBOC DAB radio signal. The blend trigger circuit of the main audio blend channel indicates to the blending circuit 1208 to use the digital audio signal of the main audio program or an input signal received from an analog audio source to produce the audio output signal. The analog audio source may be a sampling circuit included in the radio receiver that samples and digitizes the analog signal included in the hybrid IBOC DAB radio signal. In either case, the blend trigger circuit for the main audio program blend channel provides the blending indication to the blending circuit 1208 when the main audio program is selected for play.

The methods and devices described herein allow for a radio receiver to perform look-ahead decoding of audio programs in anticipation of a selection by a user of the receiver. This ensures that if the user selects a program, the audio for the program will be available for play. This improves the radio listening experience for the user.

ADDITIONAL EXAMPLES AND DISCLOSURE

Example 1 includes subject matter (such as a radio signal processing circuit) comprising multiple audio blend channels, an audio decoder, a program selector, and a blending circuit. The multiple audio blend channels are configured to receive digital audio packets for multiple supplemental audio programs. Each audio blend channel includes an audio blend buffer configured to store the digital audio packets for a program of the multiple supplemental audio programs, and a signal quality metric (SQM) circuit configured to determine an audio quality indicator for the digital audio packets of the program and indicate availability of the program according to the audio quality indicator regardless of whether the program is selected for play. The audio decoder is configured to decode digital audio packets to produce a digital audio signal. The program selector is configured to provide digital audio packets from a selected audio blend channel to the audio decoder. The blending circuit is configured to blend the digital audio signal produced for the selected audio blend channel with a signal representing silence according to the audio quality indicator for the audio blend channel.

In Example 2, the subject matter of Example 1 optionally includes each audio blend channel including a blend trigger circuit configured to generate a blend signal that indicates, according to simultaneously determined audio quality indicators, to use the digital audio packets of the corresponding audio blend buffer to produce the audio output signal or to use the signal representing silence to produce the audio output signal, and provide the blend signal to the blending circuit when the audio blend channel is selected.

In Example 3, the subject matter of one or both of Examples 1 and 2 optionally includes audio transport circuitry configured to produce digital audio packets for a main audio program using an all-digital in-band on-channel (IBOC) digital audio broadcasting (DAB) radio signal, and a main audio program blend channel configured to receive the digital audio packets for the main audio program. The main audio program blend channel includes a blend trigger circuit configured to generate a blend signal that indicates, according to the determined audio quality indicators, to use the digital audio signal for the main audio program to produce the audio output signal or to use the signal representing silence to produce the audio output signal when the main audio program blend channel is selected.

In Example 4, the subject matter of one or any combination of Examples 1-3 optionally includes audio transport circuitry configured to produce digital audio packets for a main audio program using a hybrid in-band on-channel (IBOC) digital audio broadcasting (DAB) radio signal, and a main audio program blend channel configured to receive the digital audio packets for the main audio program. The main audio program blend channel including a blend trigger circuit configured to generate a blend signal that indicates, according to the determined audio quality indicators, to use the digital audio signal for the main audio program to produce the audio output signal or to use an input signal received from an analog audio source to produce the audio output signal when the main audio program blend channel is selected.

In Example 5, the subject matter of one or any combination of Examples 1-4 optionally includes an SQM circuit configured to generate an indication of availability of audio data for each program of the multiple programs according to the determined quality indicator for each program regardless of whether the program is selected for play, and provide the indications to a host controller.

In Example 6, the subject matter of one or any combination of Examples 1-5 optionally includes a program selector configured to receive selection of a program from the host controller and transfer digital audio packets from an audio blend channel for the selected program to the audio decoder.

In Example 7, the subject matter of one or any combination of Examples 1-6 optionally includes multiple audio blend channels that include a main audio program blend channel and multiple audio blend channels for the multiple supplemental audio programs. The received digital audio packets are compressed digital audio packets for the main audio program and the multiple supplemental audio programs.

Example 8 includes subject matter (such as a method for operation of an in-band on-channel (IBOC) digital audio broadcasting (DAB) radio signal receiver, a means for performing acts, or a machine-readable medium including instructions that, when performed by the machine, cause the machine to perform acts), or can optionally be combined with the subject matter of one or any combination of Examples 1-7 to include such subject matter, comprising producing digital audio packets for multiple supplemental audio programs using a broadcast IBOC DAB radio signal, simultaneously determining an audio quality indicator for the digital audio packets of each program of the multiple supplemental audio programs regardless of whether the program is selected for play, indicating availability of the multiple supplemental audio programs according to the audio quality indicators, receiving a selection of a program indicated as available, decoding digital audio packets for a selected program to produce a digital audio signal for the selected program, and blending the digital audio signal for the selected program with a signal representing silence according to the audio quality indicator.

In Example 9, the subject matter of Example 8 optionally includes executing a blend function for a selected program of the multiple supplemental audio programs. The blending function for a supplemental audio program determines, according to the determined audio quality indicators, when to use the digital audio signal for the selected program to produce the audio output signal and when to use the signal representing silence to produce the audio output signal.

In Example 10, the subject matter of one or both of Examples 8 and 9 optionally includes producing digital audio packets for a main audio program using an all-digital broadcast IBOC DAB radio signal; and executing a blend function for a main audio program when the main audio program is selected for play. The blending function for the main program determines when to use a digital audio signal for the main audio program to produce the audio output signal and when to use the signal representing silence to produce the audio output signal.

In Example 11, the subject matter of one or any combination of Examples 8-10 optionally includes producing digital audio packets for a main audio program using a hybrid broadcast IBOC DAB radio signal, and executing a blend function for a main audio program when the main audio program is selected for play. The blending function for the main program determines when to use the digital audio signal for the main audio program to produce the audio output signal and when to use an input signal received from an analog audio source to produce the audio output signal.

In Example 12, the subject matter of one or any combination of Examples 8-11 optionally includes generating an audio data indication that indicates availability of audio data for each program of the multiple supplemental audio programs according to the determined audio quality indicator for each program regardless of whether the program is selected for play.

In Example 13, the subject matter of one or any combination of Examples 8-12 optionally includes providing the audio data indication for each program of the multiple supplemental audio programs to a host controller of the radio receiver, presenting availability of a program on a user interface of the radio receiver according to the audio data indication for the program, and receiving the program selection via the user interface.

In Example 14, the subject matter of one or any combination of Examples 8-13 optionally includes buffering digital audio packets according to supplemental audio program; and decoding buffered digital audio packets of the selected program.

In Example 15, the subject matter of one or any combination of Examples 8-14 optionally includes producing digital audio packets for a main audio program and the multiple supplemental audio programs, and storing compressed main audio program data in a main program audio buffer and storing compressed supplemental audio program data for the multiple supplemental audio programs in multiple supplemental program audio buffers.

Example 16 includes subject matter (such as a radio receiver), or can optionally be combined with one or any combination of Examples 8-15 to include such subject matter, comprising a host controller; tuner circuitry configured to receive an in-band on-channel (IBOC) digital audio broadcasting (DAB) radio signal, audio transport circuitry configured to generate digital audio packets for multiple audio programs broadcast using the IBOC radio signal, and processing circuitry. The IBOC DAB radio signal includes multiple subcarriers mapped into multiple frequency partitions. The processing circuitry includes multiple audio blend channels, an audio decoder, a program selector, and a blending circuit. The multiple audio blend channels are configured to receive digital audio packets for multiple supplemental audio programs. Each audio blend channel includes an audio blend buffer configured to store the digital audio packets for a program of the multiple supplemental audio programs, and a signal quality metric (SQM) circuit configured to determine an audio quality indicator for the digital audio packets of the program and indicate availability of the program according to the audio quality indicator regardless of whether the program is selected for play. The audio decoder is configured to decode digital audio packets to produce a digital audio signal. The program selector is configured to receive selection of a program from the host controller and provide digital audio packets from an audio blend channel for the selected program to the audio decoder. The blending circuit is configured to blend the digital audio signal produced for the selected audio blend channel with a signal representing silence according to the audio quality indicator for the audio blend channel.

In Example 17, the subject matter of Example 16 optionally includes each audio blend channel including a blend trigger circuit operatively coupled to the blending circuit and configured to generate a blend signal according to simultaneously determined quality indicators and provide the blend signal to the blending circuit when the audio blend channel is selected. The blending circuit is configured to, in response to the blend signal, use the digital audio packets of the corresponding audio blend buffer or the signal representing silence to produce the audio output signal.

In Example 18, the subject matter of one or both of Examples 16 and 17 optionally includes audio transport circuitry configured to produce digital audio packets for a main audio program using an all-digital IBOC DAB radio signal. The multiple audio blend channels optionally include a main audio program blend channel configured to receive the digital audio packets for the main audio program; the main audio program blend channel including a blend trigger circuit configured to generate a blend signal that indicates, according to the determined audio quality indicators, to use the digital audio signal for the selected program to produce the audio output signal or to use the signal representing silence to produce the audio output signal when the main audio program blend channel is selected.

In Example 19, the subject matter of one or both of Examples 16 and 17 optionally includes audio transport circuitry configured to produce digital audio packets for a main audio program using an all-digital IBOC DAB radio signal. The multiple audio blend channels optionally include a main audio program blend channel configured to receive the digital audio packets for the main audio program; the main audio program blend channel including a blend trigger circuit configured to generate a blend signal that indicates, according to the determined audio quality indicators, to use the digital audio signal for the selected program to produce the audio output signal or to use an analog audio signal of the hybrid radio signal to produce the audio output signal when the main audio program blend channel is selected.

In Example 20, the subject matter of one or any combination of Examples 16-19 optionally includes a user interface. The host controller is optionally configured to present a program of the multiple supplemental programs for selection on a user interface in response to receiving an indication of availability of the program from the processing circuitry.

In Example 21, the subject matter of one or any combination of Examples 16-20 optionally includes a program selector configured to receive selection of a program from the host controller and transfer digital audio packets from an audio blend channel for the selected program to the audio decoder.

In Example 22, the subject matter of one or any combination of Examples 16-21 optionally includes audio transport circuitry configured to generate compressed digital audio packets for a main audio program and the multiple supplemental audio programs. The host controller is optionally configured to allocate one audio blend channel of the multiple audio blend channels to the main audio program and allocate multiple audio blend channels to the multiple supplemental audio programs.

These non-limiting examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A radio signal processing circuit comprising:
   multiple audio blend channels configured to receive digital audio packets for multiple supplemental audio programs, wherein each audio blend channel includes:
   an audio blend buffer configured to store the digital audio packets for a program of the multiple supplemental audio programs; and
   a signal quality metric (SQM) circuit configured to determine an audio quality indicator for the digital audio packets of the program and indicate availability of the program according to the audio quality indicator regardless of whether the program is selected for play;
   an audio decoder configured to decode digital audio packets to produce a digital audio signal;
   a program selector configured to provide digital audio packets from a selected audio blend channel to the audio decoder; and
   a blending circuit configured to blend the digital audio signal produced for the selected audio blend channel with a signal representing silence according to the audio quality indicator for the audio blend channel.

2. The radio signal processing circuit of claim 1, wherein each audio blend channel includes a blend trigger circuit configured to generate a blend signal that indicates, according to simultaneously determined audio quality indicators, to use the digital audio packets of the corresponding audio blend buffer to produce the audio output signal or to use the signal representing silence to produce the audio output signal, and provide the blend signal to the blending circuit when the audio blend channel is selected.

3. The radio signal processing circuit of claim 1, including:
   audio transport circuitry configured to produce digital audio packets for a main audio program using an all-digital in-band on-channel (IBOC) digital audio broadcasting (DAB) radio signal; and
   a main audio program blend channel configured to receive the digital audio packets for the main audio program;
   the main audio program blend channel including a blend trigger circuit configured to generate a blend signal that indicates, according to the determined audio quality indicators, to use the digital audio signal for the main audio program to produce the audio output signal or to use the signal representing silence to produce the audio output signal when the main audio program blend channel is selected.

4. The radio signal processing circuit of claim 1, including:
   audio transport circuitry configured to produce digital audio packets for a main audio program using a hybrid in-band on-channel (IBOC) digital audio broadcasting (DAB) radio signal; and
   a main audio program blend channel configured to receive the digital audio packets for the main audio program;
   the main audio program blend channel including a blend trigger circuit configured to generate a blend signal that indicates, according to the determined audio quality indicators, to use the digital audio signal for the main audio program to produce the audio output signal or to use an input signal received from an analog audio source to produce the audio output signal when the main audio program blend channel is selected.

5. The radio signal processing circuit of claim 1, wherein the SQM circuit is configured to generate an indication of availability of audio data for each program of the multiple programs according to the determined quality indicator for each program regardless of whether the program is selected for play, and provide the indications to a host controller.

6. The radio signal processing circuit of claim 5, wherein the program selector is configured to receive selection of a program from the host controller and transfer digital audio packets from an audio blend channel for the selected program to the audio decoder.

7. The radio signal processing circuit of claim 1, wherein the audio blend channels include a main audio program blend channel and a plurality of the audio blend channels for the multiple supplemental audio programs, and wherein the received digital audio packets are compressed digital audio packets for the main audio program and the multiple supplemental audio programs.

8. A method of controlling operation of an in-band on-channel (IBOC) digital audio broadcasting (DAB) radio signal receiver, the method comprising:
producing digital audio packets for multiple supplemental audio programs using a broadcast IBOC DAB radio signal;
simultaneously determining an audio quality indicator for the digital audio packets of each program of the multiple supplemental audio programs regardless of whether the program is selected for play;
indicating availability of the multiple supplemental audio programs according to the audio quality indicators;
receiving a selection of a program indicated as available;
decoding digital audio packets for a selected program to produce a digital audio signal for the selected program; and
blending the digital audio signal for the selected program with a signal representing silence according to the audio quality indicator.

9. The method of claim 8, wherein blending the digital audio signal includes:
executing a blend function for a selected program of the multiple supplemental audio programs;
wherein the blending function for a supplemental audio program determines, according to the determined audio quality indicators; when to use the digital audio signal for the selected program to produce the audio output signal and when to use the signal representing silence to produce the audio output signal.

10. The method of claim 8, including:
producing digital audio packets for a main audio program using an all-digital broadcast IBOC DAB radio signal; and
executing a blend function for a main audio program when the main audio program is selected for play;
wherein the blending function for the main program determines when to use a digital audio signal for the main audio program to produce the audio output signal and when to use the signal representing silence to produce the audio output signal.

11. The method of claim 8, including:
producing digital audio packets for a main audio program using a hybrid broadcast IBOC DAB radio signal; and
executing a blend function for a main audio program when the main audio program is selected for play;
wherein the blending function for the main program determines when to use the digital audio signal for the main audio program to produce the audio output signal and when to use an input signal received from an analog audio source to produce the audio output signal.

12. The method of claim 8, including generating an audio data indication that indicates availability of audio data for each program of the multiple supplemental audio programs according to the determined audio quality indicator for each program regardless of whether the program is selected for play.

13. The method of claim 8, wherein receiving a selection of a program includes:
providing the audio data indication for each program of the multiple supplemental audio programs to a host controller of the radio receiver;
presenting availability of a program on a user interface of the radio receiver according to the audio data indication for the program; and
receiving the program selection via the user interface.

14. The method of claim 8, wherein decoding digital audio packets for a selected program includes:
buffering digital audio packets according to supplemental audio program; and
decoding buffered digital audio packets of the selected program.

15. The method of claim 14, including:
producing digital audio packets for a main audio program and the multiple supplemental audio programs;
wherein buffering digital audio packets according to audio program includes storing compressed main audio program data in a main program audio buffer and storing compressed supplemental audio program data for the multiple supplemental audio programs in multiple supplemental program audio buffers.

16. A radio receiver comprising:
a host controller;
tuner circuitry configured to receive an in-band on-channel (IBOC) digital audio broadcasting (DAB) radio signal, wherein the IBOC DAB radio signal includes multiple subcarriers mapped into multiple frequency partitions;
audio transport circuitry configured to generate digital audio packets for multiple audio programs broadcast using the IBOC radio signal; and
processing circuitry including:
multiple audio blend channels configured to receive digital audio packets for multiple supplemental audio programs, wherein each audio blend channel includes:
an audio blend buffer configured to store the digital audio packets for a program of the multiple supplemental audio programs; and
a signal quality metric (SQM) circuit configured to determine an audio quality indicator for the digital audio packets of the program and indicate availability of the program according to the audio quality indicator regardless of whether the program is selected for play;
an audio decoder configured to decode digital audio packets to produce a digital audio signal; and
a program selector configured to receive selection of a program from the host controller and provide digital audio packets from an audio blend channel for the selected program to the audio decoder; and
a blending circuit configured to blend the digital audio signal produced for the selected audio blend channel with a signal representing silence according to the audio quality indicator for the audio blend channel.

17. The radio receiver of claim 16,
wherein each audio blend channel includes a blend trigger circuit operatively coupled to the blending circuit and configured to generate a blend signal according to simultaneously determined quality indicators and provide the blend signal to the blending circuit when the audio blend channel is selected, wherein the blending circuit is configured to, in response to the blend signal, use the digital audio packets of the corresponding audio blend buffer or the signal representing silence to produce the audio output signal.

18. The radio receiver of claim 16,
wherein the audio transport circuitry is configured to produce digital audio packets for a main audio program using an all-digital IBOC DAB radio signal;
wherein the multiple audio blend channels further include a main audio program blend channel configured to receive the digital audio packets for the main audio program; the main audio program blend channel including a blend trigger circuit configured to generate a blend signal that indicates, according to the determined audio quality indicators, to use the digital audio signal for the selected program to produce the audio output signal or to use the signal representing silence to produce the audio output signal when the main audio program blend channel is selected.

19. The radio receiver of claim 16,
wherein the audio transport circuitry is configured to produce digital audio packets for a main audio program using a hybrid IBOC DAB radio signal;
wherein the multiple audio blend channels further include a main audio program blend channel configured to receive the digital audio packets for the main audio program; the main audio program blend channel including a blend trigger circuit configured to generate a blend signal that indicates, according to the determined audio quality indicators, to use the digital audio signal for the selected program to produce the audio output signal or to use an analog audio signal of the hybrid radio signal to produce the audio output signal when the main audio program blend channel is selected.

20. The radio receiver of claim 16, including a user interface, wherein the host controller is configured to present a program of the multiple supplemental programs for selection on a user interface in response to receiving an indication of availability of the program from the processing circuitry.

21. The radio receiver of claim 16, wherein the program selector is configured to receive selection of a program from the host controller and transfer digital audio packets from an audio blend channel for the selected program to the audio decoder.

22. The radio receiver of claim 16,
wherein the audio transport circuitry is configured to generate compressed digital audio packets for a main audio program and the multiple supplemental audio programs; and
wherein the host controller is configured to allocate one audio blend channel of the multiple audio blend channels to the main audio program and allocate multiple audio blend channels to the multiple supplemental audio programs.

* * * * *